(12) United States Patent
Uralsky et al.

(10) Patent No.: US 10,424,074 B1
(45) Date of Patent: Sep. 24, 2019

(54) METHOD AND APPARATUS FOR OBTAINING SAMPLED POSITIONS OF TEXTURING OPERATIONS

(71) Applicant: NVIDIA Corporation, Santa Clara, CA (US)

(72) Inventors: Yury Uralsky, Santa Clara, CA (US); Henry Packard Moreton, Woodside, CA (US); Eric Brian Lum, Fremont, CA (US); Jonathan J. Dunaisky, Fort Collins, CO (US); Steven James Heinrich, Madison, AL (US); Stefano Pescador, Dale, TX (US); Shirish Gadre, Fremont, CA (US); Michael Alan Fetterman, Boxborough, MA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/027,136

(22) Filed: Jul. 3, 2018

(51) Int. Cl.
| *G06T 7/44* | (2017.01) |
| *G06T 7/45* | (2017.01) |
| *G06T 7/49* | (2017.01) |
| *G06T 7/60* | (2017.01) |
| *G06T 15/04* | (2011.01) |

(52) U.S. Cl.
CPC .............. *G06T 7/44* (2017.01); *G06T 7/45* (2017.01); *G06T 7/49* (2017.01); *G06T 7/60* (2013.01)

(58) Field of Classification Search
CPC combination set(s) only.
See application file for complete search history.

(56) References Cited

U.S. PATENT DOCUMENTS

| 5,469,535 | A | 11/1995 | Jarvis et al. |
| 5,838,332 | A | 11/1998 | Penna et al. |
| 6,292,193 | B1 | 9/2001 | Perry et al. |
| 6,919,904 | B1 | 7/2005 | Kilgariff |
| 7,339,590 | B1 | 3/2008 | Moskal et al. |
| 7,372,467 | B1 * | 5/2008 | Toksvig ............. G06T 15/04 345/582 |
| 7,525,553 | B2 | 4/2009 | Barenbrug et al. |
| 7,626,591 | B2 | 12/2009 | Crawfis et al. |
| 7,746,352 | B2 | 6/2010 | Everitt |
| 7,859,548 | B1 | 12/2010 | Lindholm |

(Continued)

OTHER PUBLICATIONS

Gungor, "UBI 516 Advanced Computer Graphics, Buffers and Mappings," Published by Winfred Horton, 79 pages, retrieved from https://slideplayer.com/slide/7258080/ on Jul. 11, 2018.

(Continued)

*Primary Examiner* — Wesner Sajous
(74) *Attorney, Agent, or Firm* — Leydig, Voit & Mayer, Ltd.

(57) ABSTRACT

Methods and apparatuses are disclosed for reporting texture footprint information. A texture footprint identifies the portion of a texture that will be utilized in rendering a pixel in a scene. The disclosed methods and apparatuses advantageously improve system efficiency in decoupled shading systems by first identifying which texels in a given texture map are needed for subsequently rendering a scene. Therefore, the number of texels that are generated and stored may be reduced to include the identified texels. Texels that are not identified need not be rendered and/or stored.

20 Claims, 14 Drawing Sheets

(56) References Cited

U.S. PATENT DOCUMENTS

| | | | |
|---|---|---|---|
| 7,872,648 B2 | 1/2011 | Hoppe et al. | |
| 9,355,489 B2 | 5/2016 | Peng et al. | |
| 9,905,040 B2 | 2/2018 | Burns et al. | |
| 2006/0181534 A1* | 8/2006 | Meinds | G06T 13/20 |
| | | | 345/473 |
| 2007/0103465 A1 | 5/2007 | Barenbrug et al. | |
| 2007/0120858 A1* | 5/2007 | Meinds | G06T 13/20 |
| | | | 345/473 |
| 2008/0122836 A1* | 5/2008 | Van Horn | G06T 15/04 |
| | | | 345/419 |
| 2011/0254852 A1 | 10/2011 | Howson | |
| 2014/0267345 A1* | 9/2014 | Toth | G06T 15/04 |
| | | | 345/582 |
| 2017/0039755 A1 | 2/2017 | Heggelund et al. | |
| 2017/0243375 A1 | 8/2017 | Ceylan et al. | |
| 2018/0061122 A1* | 3/2018 | Clarberg | G06F 3/013 |
| 2018/0096515 A1 | 4/2018 | Kang et al. | |

OTHER PUBLICATIONS

Preston, "Hardware Texture Mapping Methods," Published by Joshua Preston, 17 pages, retrieved from https://slideplayer.com/slide/7258080/ on Jul. 11, 2018.

* cited by examiner

METHOD AND APPARATUS FOR OBTAINING SAMPLED POSITIONS OF TEXTURING OPERATIONS

FIELD OF THE INVENTION

The present invention relates to computer generated graphics, and more particularly to obtaining sampled positions of texturing operations.

BACKGROUND

Certain decoupled shading algorithms for three-dimensional graphics render color values for scene objects into one or more associated texture maps for the scene objects during an initial rendering pass. Final pixel values for the scene are then generated in a subsequent rendering pass using texture map sampling, which may be provided by specialized, high-performance texture sampling circuits. Entire texture maps are conventionally rendered to guarantee availability of all texels potentially required to generate a final pixel value. While decoupled shading can provide certain advantages, overall system efficiency can be degraded because a significant portion of texels rendered into the associated texture maps are not actually used. Thus, there is a need for addressing these issues and/or other issues associated with the prior art.

SUMMARY

A method, computer readable medium, and system are disclosed for reporting a texture footprint. The method comprises receiving, from a shader program, a texture footprint query request that includes texture map coordinates, identifying texels comprising a texture footprint for a texture map filtering operation that corresponds to the texture footprint query request, and transmitting, to the shader program, query result information comprising the texture footprint. In an embodiment, the texture footprint query request is associated with a pixel in screen space covered by rasterized geometry. In an embodiment, transmitting comprises storing the query result information in a memory circuit that is accessible to the shader program.

The computer readable medium includes instructions that, when executed by a processing unit, cause the processing unit to perform the method. Furthermore, the system includes a processing unit configured to perform the method.

DETAILED DESCRIPTION

Embodiments of the present disclosure provide texture footprint information to a shader program in response to a texture footprint query posted to a texture map unit. The texture footprint query specifies sampling information, which may include texture coordinates, gradients at the texture coordinates, a type of sampling operation, a texture map identifier, a desired resolution for reporting a texture footprint, and any other technically relevant sampling details. Reported texture footprint information identifies which texels (texture map samples) would be sampled to form a texture footprint for an equivalent texture sampling operation performed by the texture map unit. In an embodiment, the shader program generates texture queries to identify which texels are needed to render a given scene. The identified texels are then rendered prior to rendering the scene geometry.

A given texture footprint may be located anywhere within a texture map. In an embodiment, a bitmap within the texture footprint information is configured to specify which texels are covered in the texture footprint. An anchor point may be provided within the texture footprint information to locate a bounding region for the bitmap within a texture map coordinate space. Furthermore, the reported texture footprint information may also specify one or more coarsening factors. A coarsening factor for a given dimension may be calculated to indicate how many texels in the dimension correspond to a given bit in the bitmap.

In various embodiments, circuitry comprising a footprint generation unit is configured to identify texels within a texture footprint, given a set of sampling information. One or more instances of the footprint generation unit may be used to generate a response to a texture footprint query as well as perform an equivalent texture sampling operation.

Figure 1A:
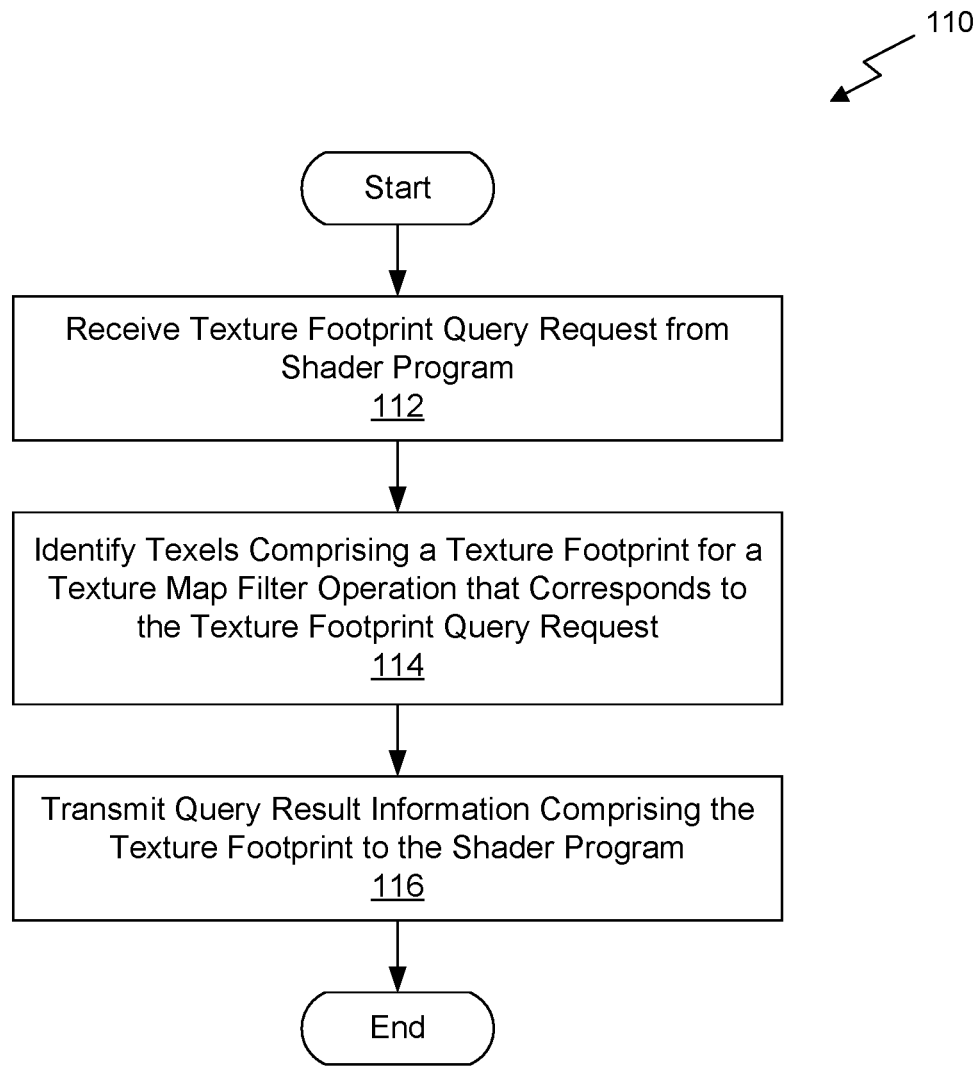
FIG. 1A illustrates a flowchart of a method for reporting a texture footprint, in accordance with an embodiment.

FIG. 1A illustrates a flowchart of a method 110 for reporting a texture footprint, in accordance with an embodiment. Although method 110 is described in the context of a processing unit, the method 110 may also be performed by a program executed by a processing unit, any custom circuitry, or by a combination of custom circuitry and a program. For example, the method 110 may be executed by a GPU (graphics processing unit), a CPU (central processing unit), or any other technically feasible processor. Furthermore, persons of ordinary skill in the art will understand that any system that performs method 110 is within the scope and spirit of various embodiments. In an embodiment, method 110 is performed by a texture map unit within a GPU.

At step 112, the texture map unit receives a texture footprint query request from a shader program. In an embodiment, the texture footprint query request includes texture map coordinates. In an embodiment, the texture footprint query request is associated with a pixel in screen space that is covered by rasterized geometry. In an embodiment, the texture map coordinates are specified in two dimensions. In another embodiment, the texture map coordinates are specified in three dimensions. In yet another embodiment, the texture map coordinates are configured to identify a location within a cube-map. In certain embodiments, the texture footprint query request further comprises a gradient at each of the texture map coordinates. In an embodiment, the texture footprint query request further comprises a texture map level of detail parameter corresponding to the texture footprint. The level of detail parameter may specify a particular base map level, a level of detail bias or clamp relative to a map level, any other parameter related to selecting one or more map levels, or any combination thereof. In an embodiment, the texture footprint query request further comprises a resolution specification for the query result information. The resolution specification indicates how many discrete coverage samples in each dimension of the bitmap are requested by the texture footprint query. Each coverage sample is assigned one bit in the bitmap. For example, a resolution specification of 4×4 coverage samples will cause the texture map unit to generate a 4×4 bitmap regardless of how many texels are actually covered in a corresponding texture footprint. In such an example, if the texture footprint is six texels wide, then a coarsening factor of two may be reported for the horizontal dimension and a coarsening factor of one may be reported for the vertical dimension, thereby giving the 4×4 bitmap an effective width of eight texels and an effective height of four texels. With these coarsening factors, each bit in the bitmap represents coverage for two horizontally adjacent texels.

At step 114, the texture map unit identifies texels comprising a texture footprint for a texture map filtering operation that corresponds to the texture footprint query request. The texture map unit may identify the texels using any technically feasible technique in the art, and in particular the texture map unit uses a technique that identifies an identical set of texels for both the texel footprint query and a texture sampling operation. In an embodiment, the texture map unit uses an identical technique for performing both texel footprint queries and texture sampling operations. In certain embodiments, the texture map unit may implement identical instances of logic circuitry for performing texel footprint queries and texture sampling operations.

At step 116, the texture map unit transmits query result information comprising the texture footprint to the shader program. In an embodiment, the texture map transmits the query result information by storing the query result information in a memory circuit that is accessible to the shader program. The shader program then retrieves the query result information from the memory circuit.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
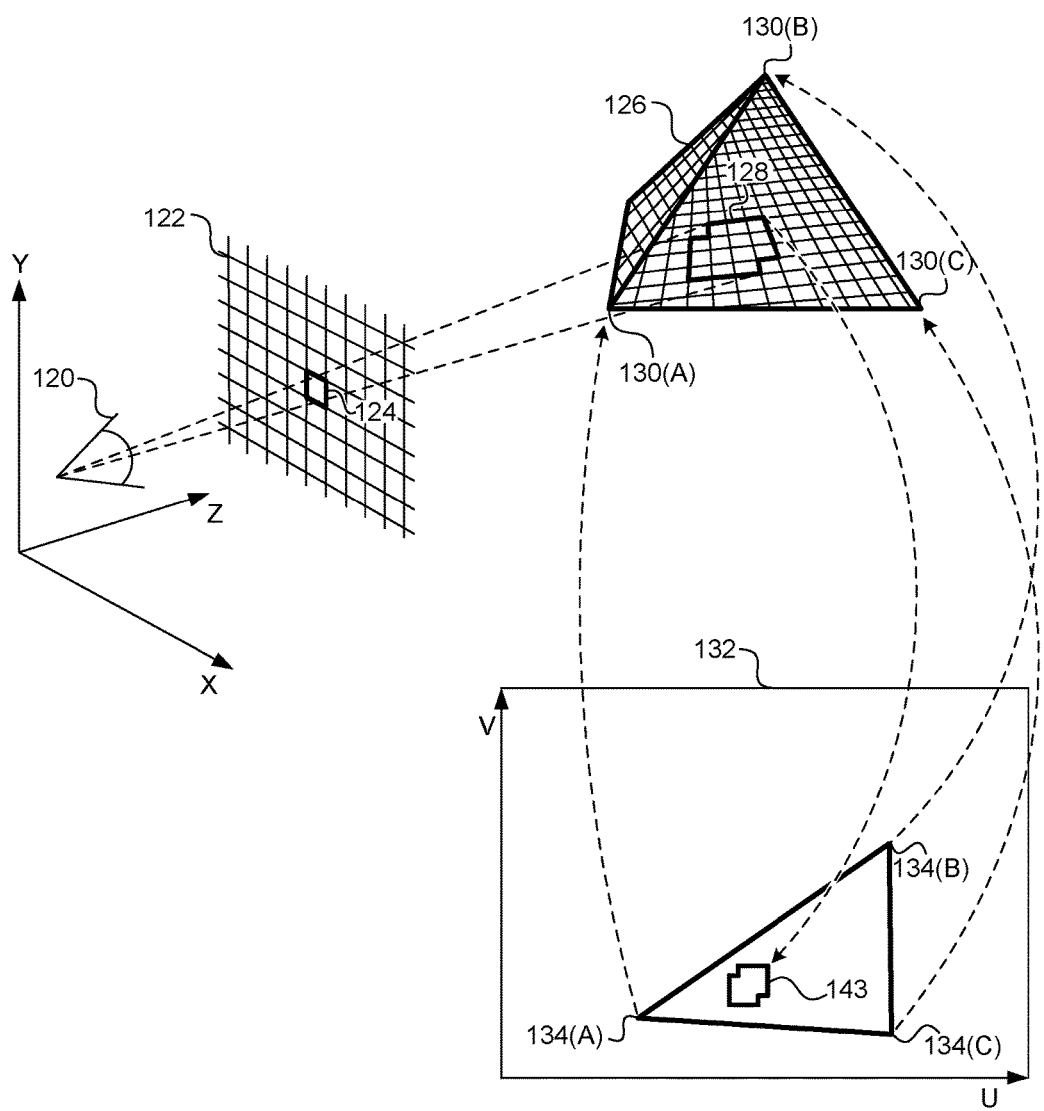
FIG. 1B illustrates texture mapping, in accordance with an embodiment.

FIG. 1B illustrates texture mapping, in accordance with an embodiment. As shown, a camera 120 is positioned in a three-dimensional (3D) space to view a geometric object 126 through a view plane 122. The geometric object 126 is depicted as a pyramid wrapped in a grid of rectangles, with each rectangle corresponding to a texel of a texture map 132. The texture map 132 is a two-dimensional (2D) structure configured to store a texture image, which may be any type of image such as a photograph or a computer generated image. Texture map locations 134(A), 134(B), and 134(C) are mapped to vertices 130(A), 130(B), and 130(C), respectively. When the geometric object 126 is rendered, texel samples of the texture image are fetched and filtered from the texture map 132 to give the geometric object an appearance of a portion of the texture image.

A pixel 124 on the view plane 122 has an associated projection region 128 on the geometric object 126. The projection region 128 is depicted as including rectangular texel samples mapped to the geometric object 126 form the texture map 132. The shape of the projection region depends on a position of camera 120 relative to an intersecting surface on geometric object 126. The shape of the projection region also depends on which type of sampling is used to generate the pixel 124. For example, point sampling (not shown) uses one point, typically taken from a central region of the pixel projected to a face of the geometric object 126. Point sampling typically yields relatively low quality rendered images and image sequences. Higher quality images may be rendered using multiple texels that form a larger projection region 128. For example, anisotropic rendering uses multiple texels within the projection region 128, which may have an arbitrary shape and size. As shown in the present example, the projection region 128 includes fourteen samples fetched from texture map 132.

A texture footprint 143 is a region within the texture map 132 (i.e. within texture space) that corresponds to the projection region 128. In practice, geometric primitives comprising the geometric object 126 are projected and rasterized into the view plane 122 (i.e., within screen space) to identify all pixels covered by the geometric primitives for a given position of camera 122, a given position of view plane 122, and positions of the geometric primitives. In this way, pixel 124 may be identified as covering geometric object 126. Furthermore, references to pixel 124 may retain various attributes of a corresponding geometric primitive, such as texture coordinates and gradients that define angular relationships between the camera and the projection region 128. Furthermore, texels comprising texture footprint 143 may be identified based on texture coordinates and associated gradients.

Figure 1C:
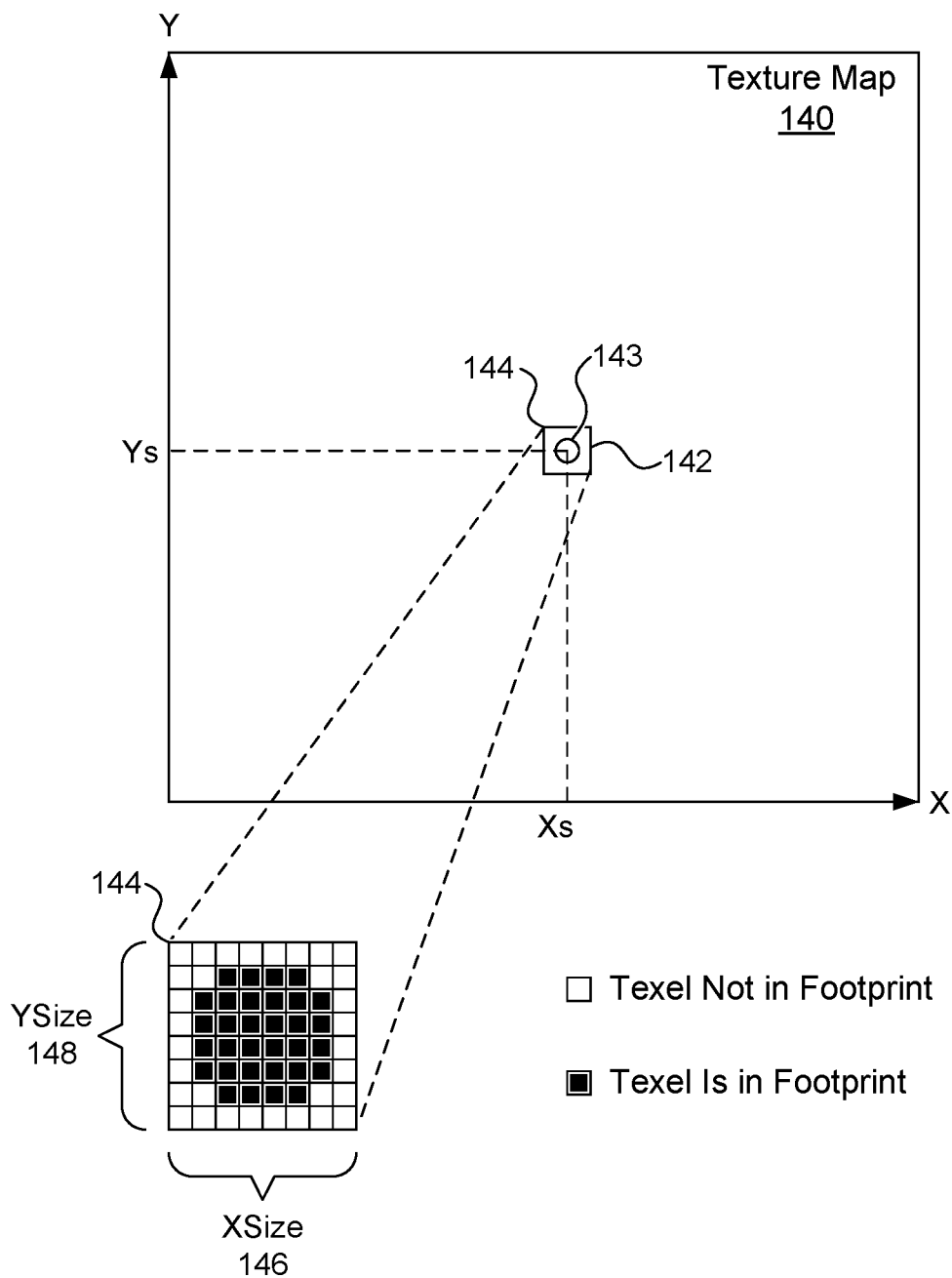
FIG. 1C illustrates an exemplary texture footprint, in accordance with an embodiment.

FIG. 1C illustrates an exemplary texture footprint 143, in accordance with an embodiment. As shown, a bounding region 142 is positioned to fully encompass the texture footprint 143, which is located within a texture map 140 according to 2D texture coordinates (Xs, Ys). A given sample taken from the texture map 140 at the texture coordinates is calculated from texels comprising the texture footprint 143. An anchor point 144 is calculated to locate the bounding region 142 to encompass the texture footprint 143. The anchor point 144 may be aligned along certain texel boundaries (e.g., even texels), word boundaries, cache boundaries, or any other technically relevant boundary. Consequently, although the anchor point 144 is shown at the top left corner of the bounding region 142, the anchor point 144 may be located instead at an offset from the top left corner, according to different implementation requirements.

The bounding region 142 includes a size in each dimension. As shown, for a 2D texture, the bounding region 142 has a horizontal size (XSize 146) and a vertical size (YSize 148). A grid of texels comprise the bounding region 142, with texels covered by the texture footprint 143 shown as black squares and texels not covered by the texture footprint 143 shown as white squares. In this example, the texture footprint 143 fits naturally within an 8×8 bounding region 142. In an embodiment, a 3D bounding region (not shown) may be a volume, having an XSize 146, a YSize 148, a depth size. In another embodiment, a bounding region may be configured to cover one or more faces of cube-map (not shown).

Texture space coordinates are shown here as X and Y for convenience, however U and V are commonly used for non-normalized texture space coordinates and S and T are commonly used for normalized texture space coordinates.

In an embodiment, the query result information comprises a bitmap and a coarsening factor. The bitmap is generated to indicate the texture footprint according to the resolution specification. The coarsening factor is generated to indicate a scale having a value of one or more texels per bit of the bitmap in a dimension of the resolution specification. Furthermore, the coarsening factor may be calculated to encompass the texture footprint in the dimension based on the resolution specification.

Figure 1D:
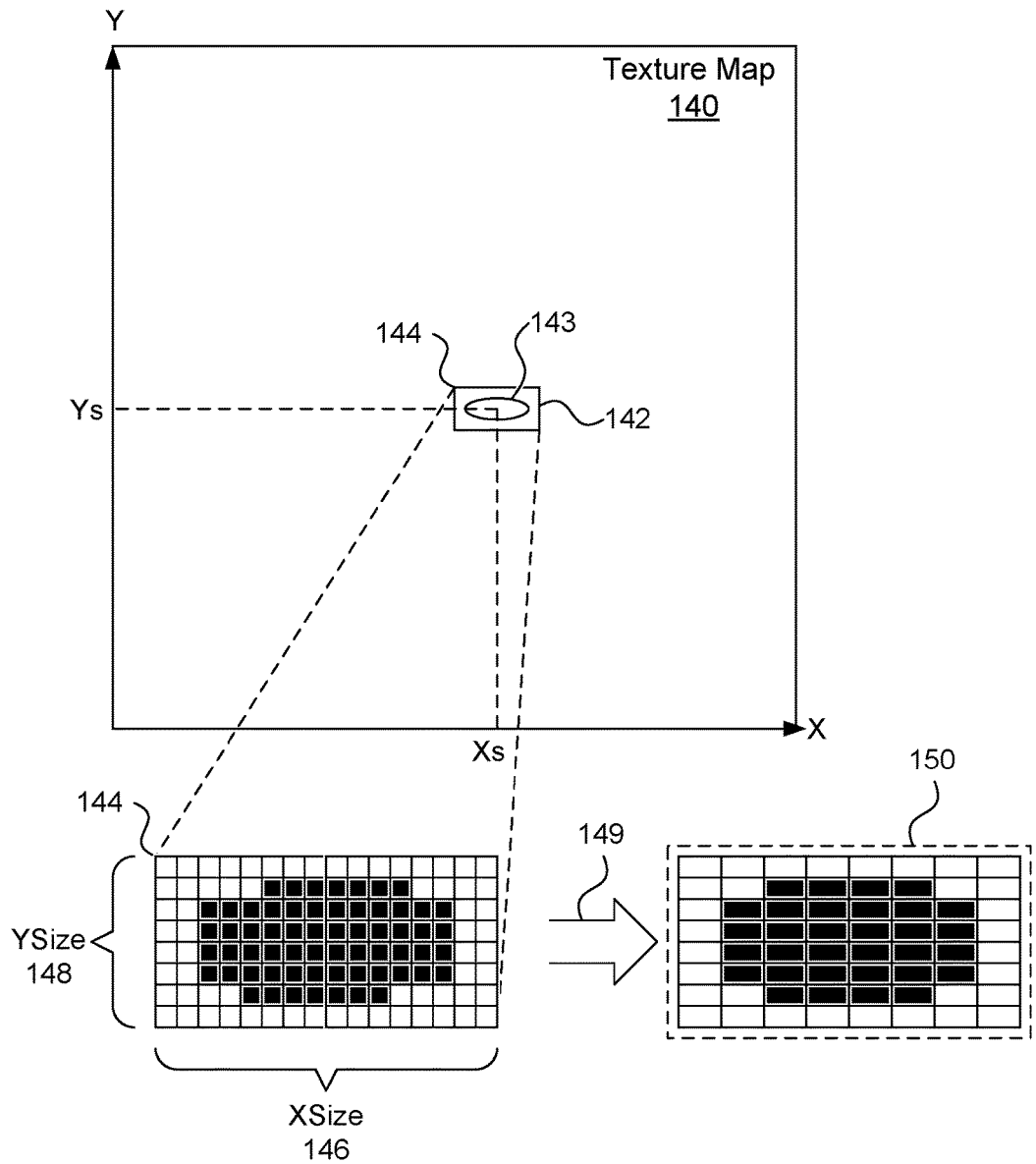
FIG. 1D illustrates coarsening for a texture footprint, in accordance with an embodiment.

FIG. 1D illustrates coarsening for a texture footprint 143, in accordance with an embodiment. As shown, the bounding region 142 for the texture footprint 143 is sixteen texels wide (XSize 146 is equal to sixteen) and eight texels tall (YSize 148 is equal to eight). To fully represent an 8×16 region in full detail would require one-hundred twenty eight bits. In an embodiment, a sixty-four bit approximation is used to represent the 8×16 region, along with a coarsening factor of one for YSize and a coarsening factor of two for XSize. The sixty-four bit approximation allows the texture footprint 143 to be represented by a fixed length sixty-four bit bitmap 150. A grid of texels comprise the bounding region 142, with texels covered by the texture footprint 143 shown as black squares and texels not covered by the texture footprint 143 shown as white squares. A coarsening operation 149 maps the texel coverage of the bounding region 142 to a fixed length bitmap 150 (e.g., a sixty-four bit bitmap) comprising bits for indicating whether a given texel group is covered by the texture footprint 143. As shown, two horizontally adjacent texels in the bounding region 142 form one 1×2 texel group. Coverage for one 1×2 texel group is indicated by one bit in the fixed length bitmap 150. In an embodiment, if any texel in a given texel group is covered by the texel footprint 143, a corresponding bit is set in the fixed length bitmap 150. In an embodiment, a texel group having an arbitrary size (e.g., 1×2, 2×1, 2×2, 4×2, 2×4, and so forth) may be mapped to a bit in the fixed length bitmap 150. In certain embodiments, each dimension of the texel group is limited to a power of two integer (e.g., 1, 2, 4, 8, 16, etc.).

In an embodiment, the bitmap is a fixed length bitmap, and each bit of the fixed length bitmap represents a region of one or more texels covered by the texture footprint. In an embodiment, the fixed length bitmap comprises sixty-four bits. In other embodiments, the fixed length bitmap comprises more bits or fewer bits and may contain a number of bits consistent with a native word size for a given GPU. In operation, the texture map unit calculates the coarsening factor to map the texture footprint into the fixed length bitmap. For example, with a sixty-four bit bitmap and an 8-by-8 resolution specification, a texture footprint of 8-by-8 texels may be represented using a coarsening factor of one in each dimension. In another example, with the sixty-four bit bitmap and an 8-by-8 resolution specification, a texture footprint of 16-by-16 texels may be represented using a coarsening factor of two in each dimension. In various embodiments, the sixty-four bit bitmap is organized as one of 8-by-8 texels, 16-by-4 texels, 32-by-2 texels 2D resolutions, and one or more 3D resolution comprising, for example, 4-by-4-by-4 texels.

Figure 1E:
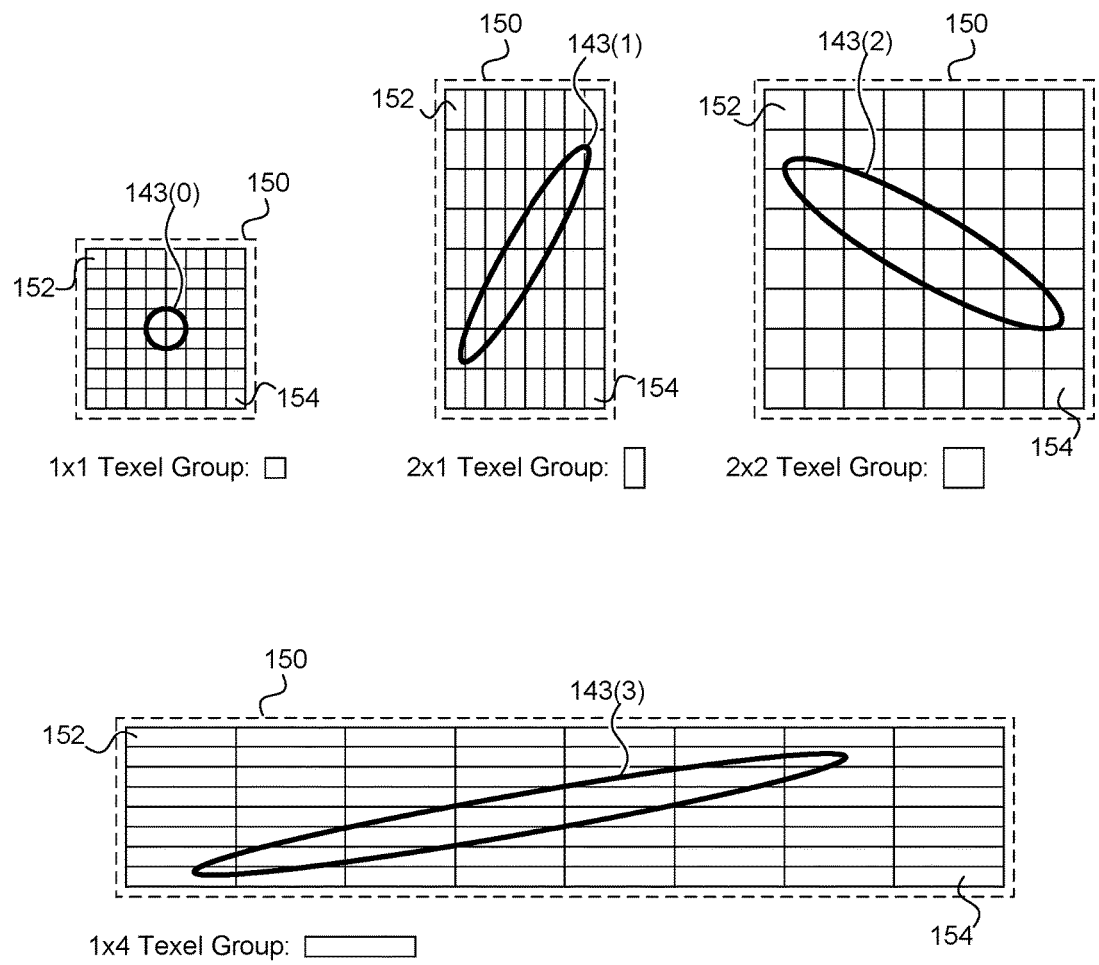
FIG. 1E illustrates different texel group sizes for different texture footprints, in accordance with an embodiment.

FIG. 1E illustrates different texel group sizes for different texture footprints, in accordance with an embodiment. As shown, fixed length bitmap 150 may directly represent a texture footprint 143(0) that fits within a specified resolution of 8×8 texels. In this example, one texel comprises one 1×1 texel group and maps to one bit in the fixed length bitmap 150. A first bit 152 of the fixed length bitmap 150 indicates coverage for the upper left texel group, while a different bit 154 of the fixed length bitmap 150 indicates coverage for the bottom right texel group. With 1×1 texel groups, each bit in the fixed length bitmap 150 represents one texel.

Fixed length bitmap 150 may also represent a texture footprint 143(1) with a vertical extent that is larger than eight texels. In this example two texels comprise one 2×1 texel group, and each 2×1 texel group maps to one bit in the fixed length bitmap 150. In this example, the first bit 152 of the fixed length bitmap 150 indicates coverage for two texels in a corresponding texel group. If either of the two texels is covered, the first bit 152 is assigned to indicate coverage for the 2×1 texel group. Similarly, the fixed length bitmap 150 may represent texture footprints 142(2) and 143(3), each with different texel group sizes.

In various embodiments, the coarsening factors provide a mapping from highly elongated texture footprints covering an arbitrarily large number of texels into a fixed length bitmap representation for the covered texels. When multiple texels are represented by one bit in the bitmap, if any one of the multiple texels is covered by the texture footprint, the bit is set to indicate that at least one texel is covered. In this way, all of the multiple texels are considered to be included in the texture footprint if any one of them is included. Coarsening factors are calculated by the texture map unit and transmitted, along with the bitmap and other query result information to the shader program.

While this approach of representing a texture footprint with a fixed length bitmap can occasionally include additional texels beyond a strict minimum set to be marked covered, the additional texels represent an insignificant inefficiency in practical applications. Furthermore, maintaining a fixed length bitmap for arbitrary texture footprints provides the benefit of overall architectural efficiency in practical texture map unit implementations.

Figure 1F:
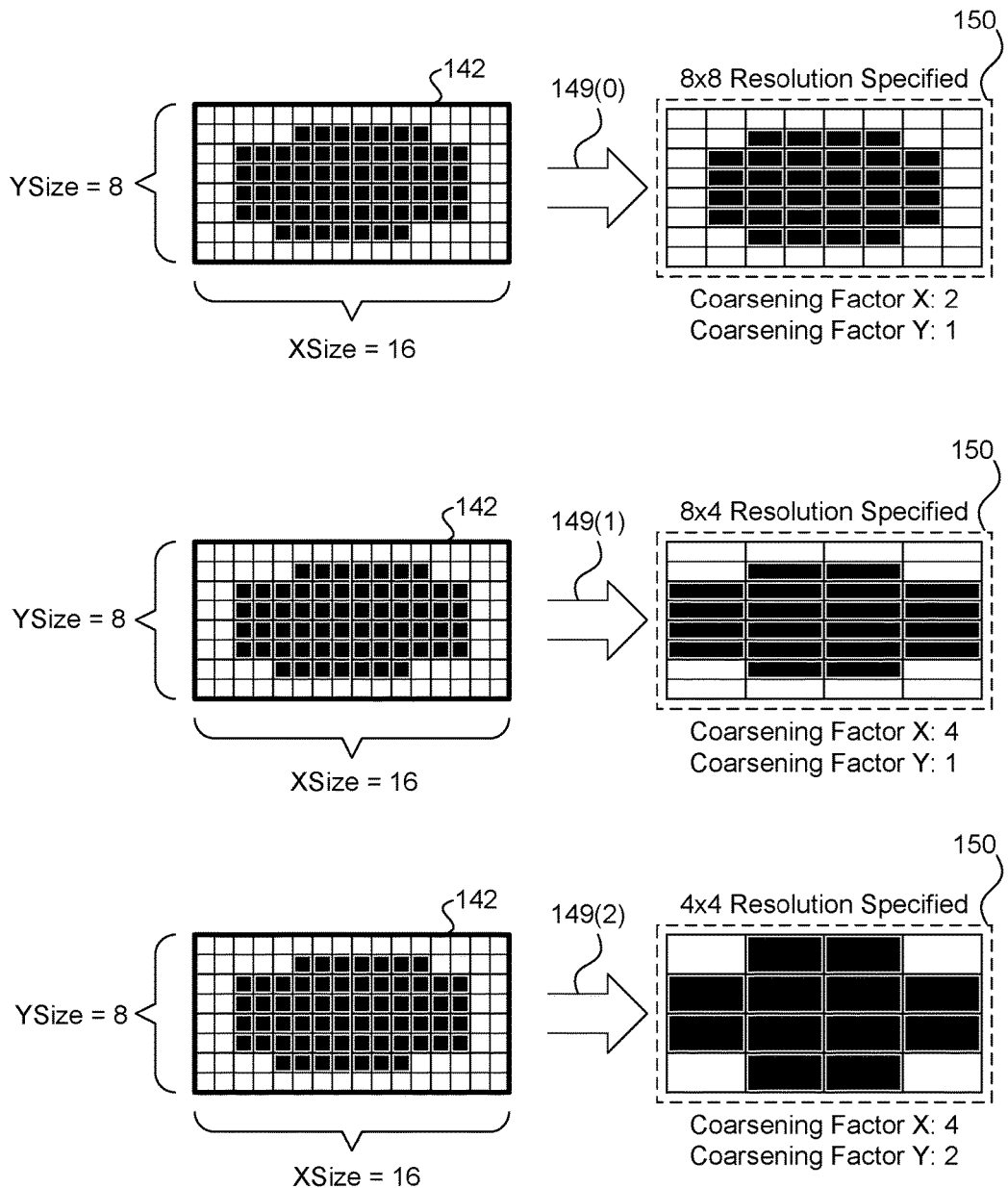
FIG. 1F illustrates different coarsening granularities for the same texture footprint, in accordance with an embodiment.

FIG. 1F illustrates different coarsening granularities for the same texture footprint, in accordance with an embodiment. As shown, bounding region 142 is eight texels in height (YSize=8) and sixteen texels in width (XSize=16). A coarsening operation 149(0) maps the bounding region 142 to an 8×8 bitmap (e.g., fixed length bitmap 150), according to a resolution specification. The resolution specification may be indicated as part of an associated texture footprint query. A different coarsening operation 149(1) maps the bounding region 142 to an 8×4 bitmap, according to a different resolution specification. Similarly, yet another coarsening operation 149(2) maps the bounding region 142 to a 4×4 bitmap, according to a yet different resolution specification. As shown, different coarsening factors may be applied to map the bounding region 142 to a bitmap of a given resolution specification.

In an embodiment, identifying the texels within a texture footprint comprises projecting a texture sampling region into texel space at specified texture map coordinates to produce the texture footprint, and marking each texel covered by the projected texture sampling region. In a simple bilinear sampling example, the texture coordinates determine the center of a 2×2 sampling kernel within texture space. In such an example, gradients are not necessary except for potentially selecting a level of detail (LOD) map for the sampling operation. Significantly higher image quality may be achieved using anisotropic sampling, which uses specified gradients to project a texture sampling region from screen space to texture space on a geometric object to determine a texture footprint. In some cases, the texture footprint may be highly elongated in texture space, such as the texture footprints 143(1), 143(2), and 143(3) shown in FIG. 1E.

Figure 2:
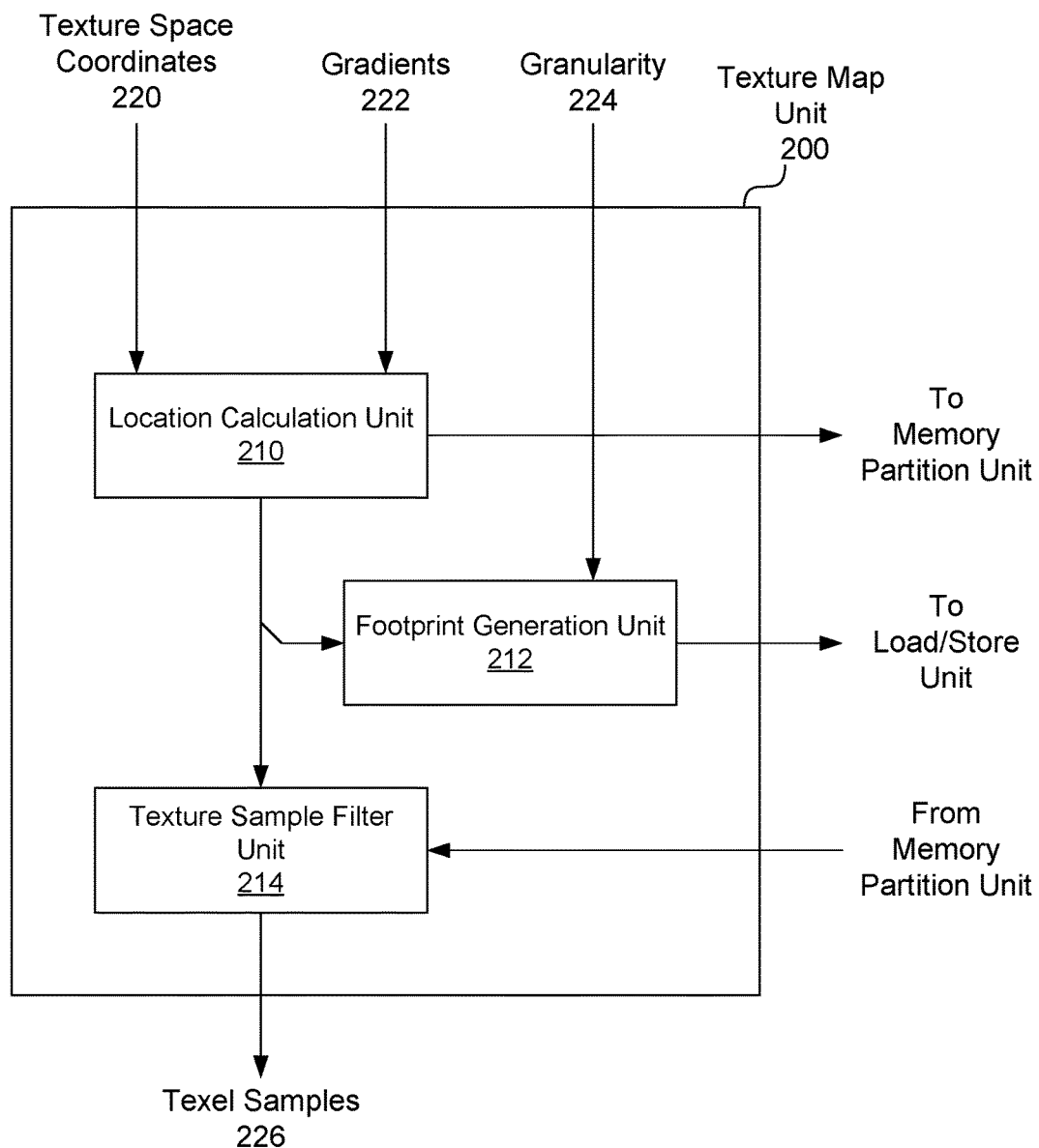
FIG. 2 illustrates a texture map unit configured to perform texture footprint query operations, in accordance with an embodiment.

FIG. 2 illustrates a texture map unit 200 configured to perform texture footprint query operations, in accordance with an embodiment. As shown, texture map unit 200 includes a location calculation unit 210, a footprint generation unit 212, and a texture sample filter unit 214. In an embodiment, the texture map unit 200 is implemented within special function units (SFUs) 552 of FIG. 5A. One or more functions of the texture map unit 200 may be implemented using dedicated logic circuits. Alternatively, the texture map unit 200 may be implemented, at least in part, as a shader program, and may operate within the fragment shading stage 670 of FIG. 6.

The texture map unit 200 is configured to receive texture space coordinates 220, gradients 222, and a granularity 224. The texture space coordinates 220 may be scaled according to a particular texture map resolution (e.g., u,v coordinates) or the texture coordinates 220 may be normalized (e.g., s,t coordinates). The gradients 222 may include partial derivatives of screen space relative to texture space. For example, gradients 222 may include four partial derivatives: $\partial u/\partial x$, $\partial u/\partial y$, $\partial v/\partial x$, and $\partial v/\partial y$, for 2D texture space coordinates 220, where x and y are screen space coordinate variables, and u and v are texture space coordinate variables. The granularity 224 may include a specified resolution for a coverage bitmap (e.g., fixed length bitmap 150). Furthermore, a level of detail (LOD) may be specified and received by the texture map unit 200.

In an embodiment, the texture map unit 200 is configured to perform texture sampling operations and, separately, perform texture footprint query operations. The texture sampling operations and texture footprint query operations may be presented as requests or instructions to the texture map unit 200. Any technically feasible instruction set architecture (ISA) construction may be implemented for the requests or instructions without departing the scope and spirit of embodiments of the present disclosure. In an embodiment, posting a texture sampling instruction (with related information such as texture coordinates, an LOD, etc.) to the texture map unit 200 represents a texture sampling request, while posting a texture query instruction (with related information) to the texture map unit 200 represents a texture footprint query request. A given shader program may post a plurality of texture sampling instructions and/or texture query instructions while executing.

In an embodiment, the texture map unit 200 performs texture sampling (e.g., a texture fetch) by causing the location calculation unit 210 to determine which texels are covered by an associated texture sampling request, and to generate read requests to retrieve covered texels. The read requests are transmitted to one or more memory partition units, such memory partition unit(s) 380 of FIG. 3. The texture sample filter unit 214 is configured to receive texels from the memory partition unit that were requested by the location calculation unit 210 and combine the texels to generate a single sampled color for the texture space coordinates.

Figure 5A:
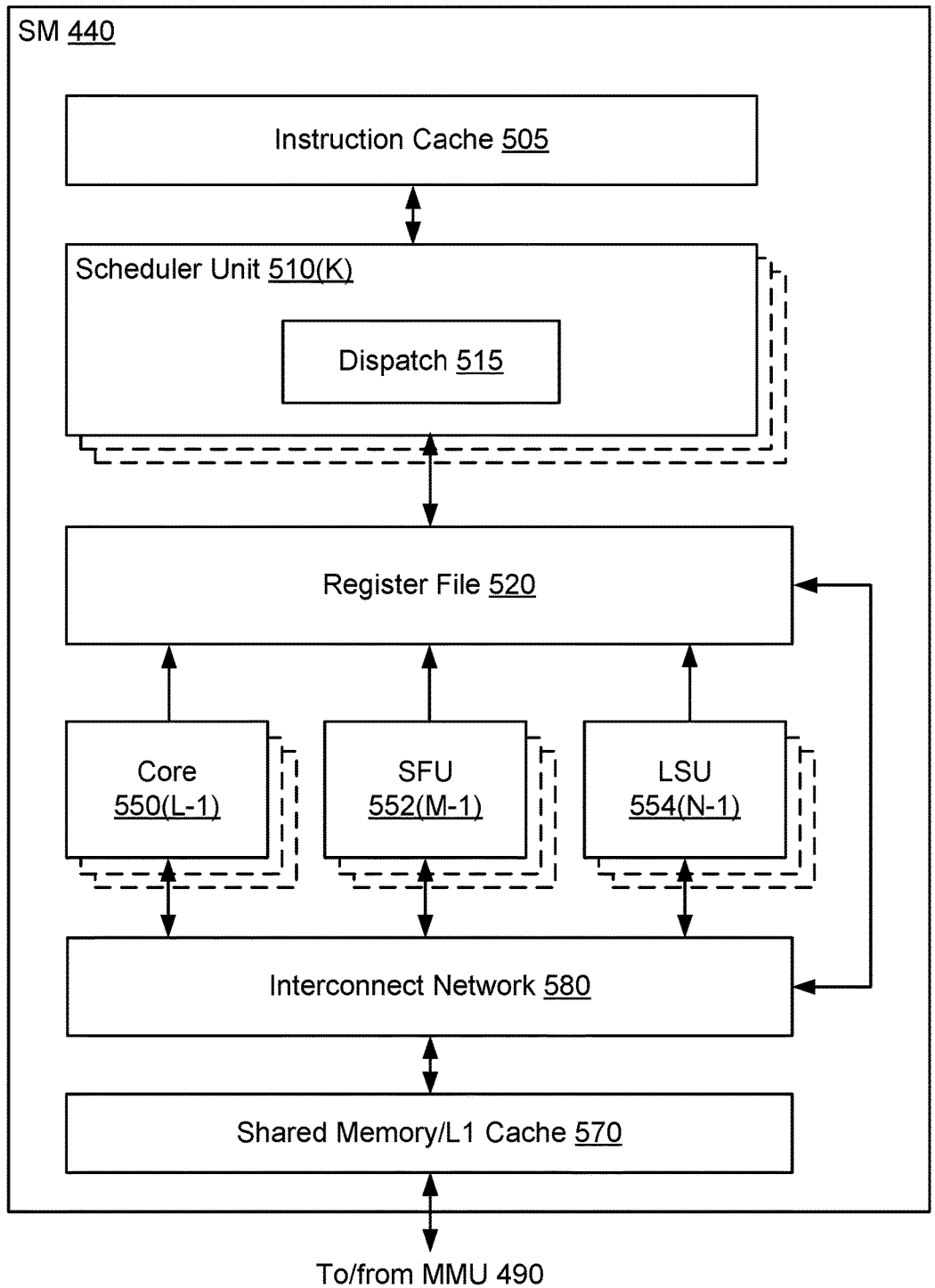
FIG. 5A illustrates the streaming multi-processor of FIG. 4A, in accordance with an embodiment.

In an embodiment, the texture map unit 200 performs footprint queries by causing the footprint generation unit 212 to determine which texels are covered by an associated texture footprint query request, and to write out a representation of the covered texels to one or more load/store units, such as load/store units (LSUs) 554 of FIG. 5A. The specified resolution (e.g., granularity 224) in each texture space dimension may be transmitted to the footprint generation unit 212, which generates a representation of texel coverage (i.e., a texture footprint) within a specified resolution. In an embodiment, the footprint generation unit 212 generates a bitmap to represent the texel coverage. A representation of the texture footprint, such as data comprising the bitmap, may be transmitted to a load/store unit, which writes texture footprint to a memory circuit that is accessible to the shader program.

In an embodiment, texture footprint information transmitted to the shader program is stored in an application data structure for later processing. The application data structure may include a work queue that lists which texels are required to be shaded prior to a subsequent rendering pass for a scene. A given texel may be listed multiple times in the work queue in connection with rasterization of a given geometric object or objects in the scene, leading to duplication of texel references in the work queue. Each texel reference, including duplicates, in the work queue requires shading work. While such duplication may yield correct results, shading the same texel more than once may be inefficient. Deduplication in this context refers to removing duplicate references to the same texel in the work queue. In an embodiment, the later processing may include both deduplication of texel references in the work queue and shading texels identified by the texel references. A given texel reference may identify, without limitation, a specific texture map and a location within the texture map. In certain embodiments, two or more LODs for a texture map are accessed to generate one texture sample (e.g., trilinear sampling). In such a scenario, the shader program may post separate texture footprint query requests, each specifying a different LOD, and store reported texture footprint information in an application data structure.

In an embodiment, a shader program is configured to use the bitmaps in conjunction with de-duplicated texel references (either locally or globally) and record referenced texels (e.g., texel addresses) in application data structures for later processing. For example, de-duplicated texel references can be used to create a list of texels and/or texture pages that will be accessed by subsequent texture filter operations for shading a given frame. Such a list may be used as a work queue for rendering a subset of texels used for shading the frame.

In another embodiment, a texture footprint query operation provides a building block for algorithms performing deferred processing of texture data, such as virtual texturing, on-demand paging, decoupled shading, and texel shading. When combined with existing support for tiled resources, the footprint query operation can also be used to guide dynamic memory allocation for sparse textures, among various types of other operations.

Parallel Processing Architecture

Figure 3:
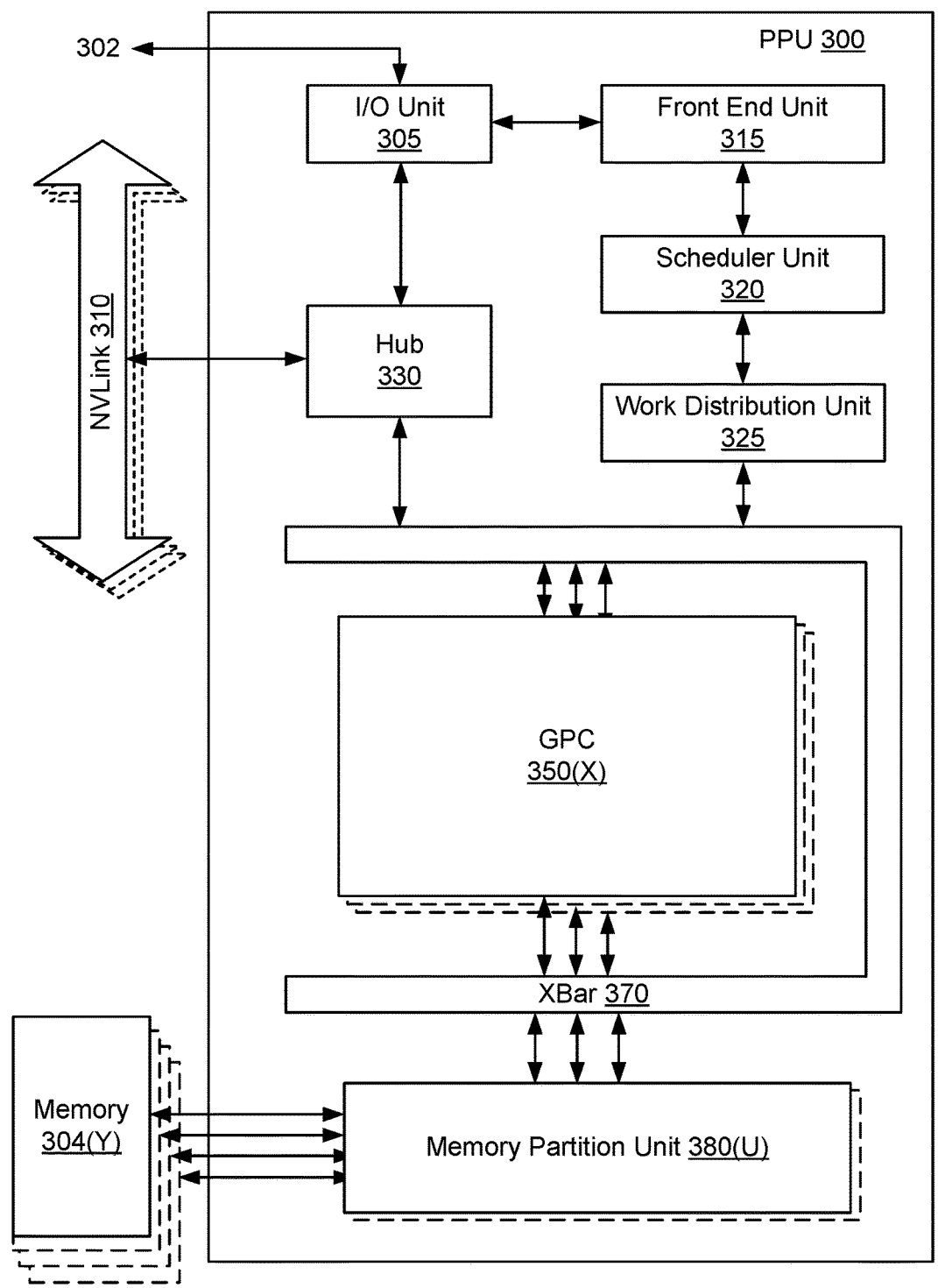
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
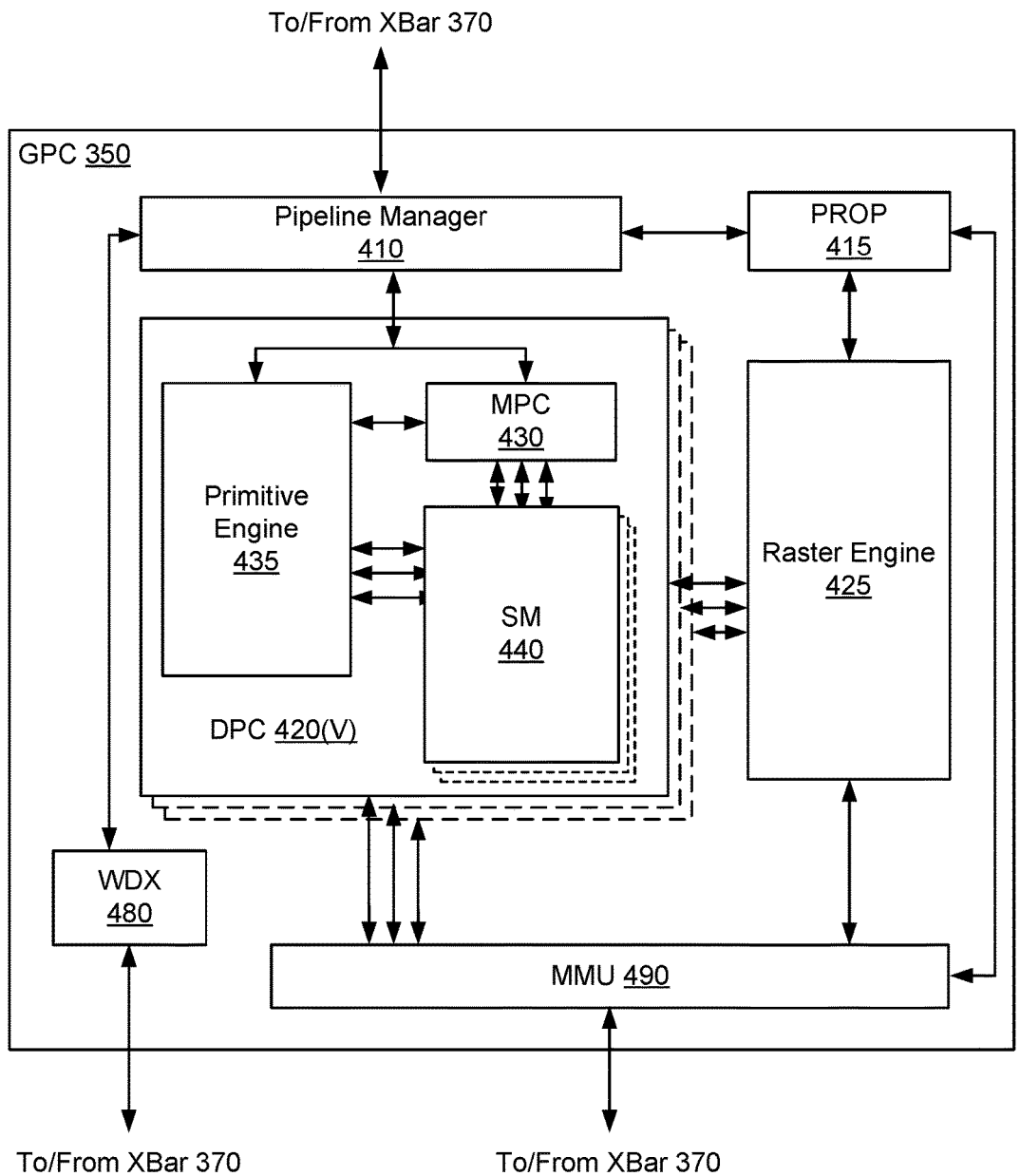
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
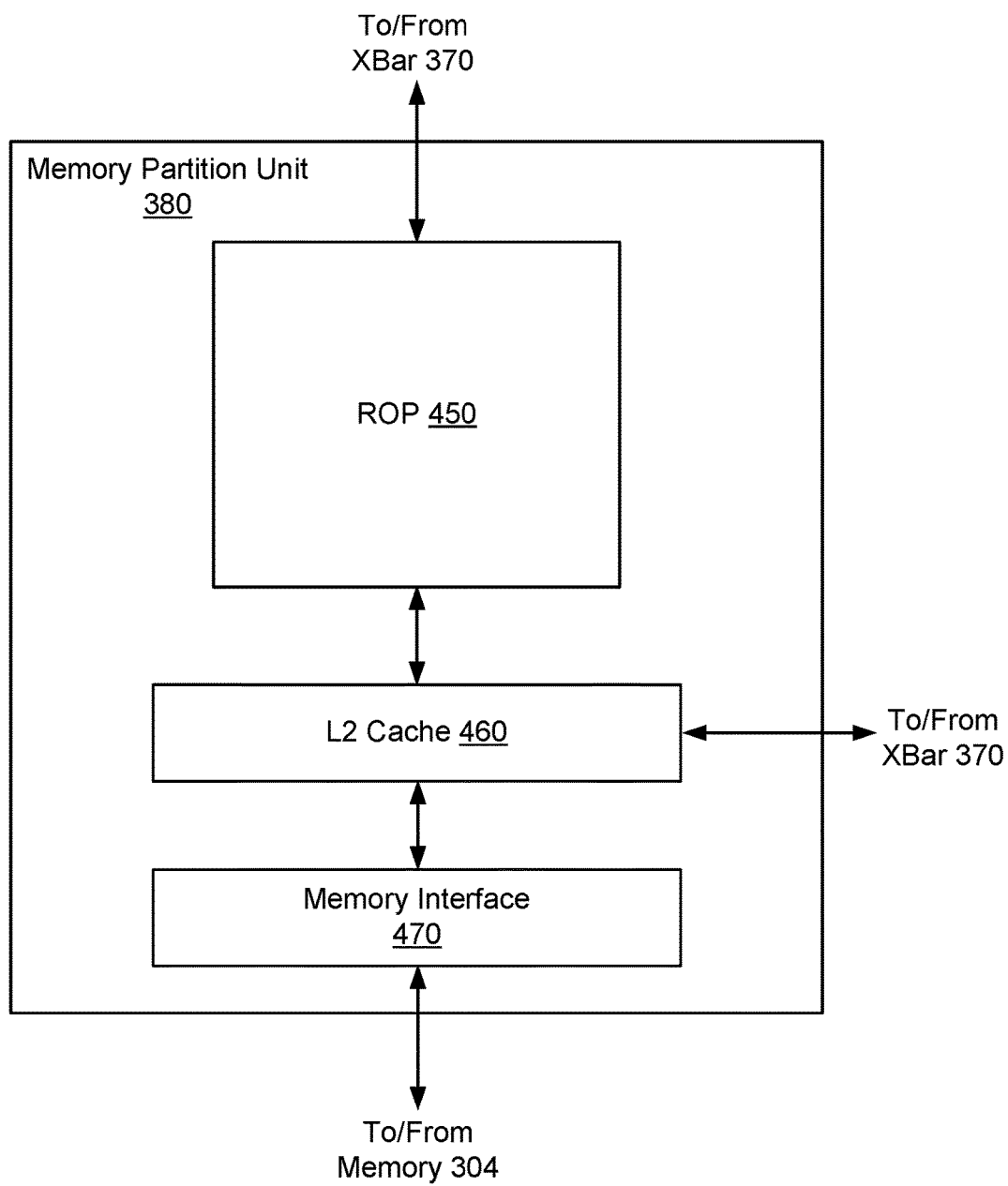
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (i.e., texture maps of varying levels of detail). In an embodiment, each SM 340 includes two texture units. In an embodiment, at least one of SFUs 552 is configured to include at least one instance of texture map unit 200.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Figure 5B:
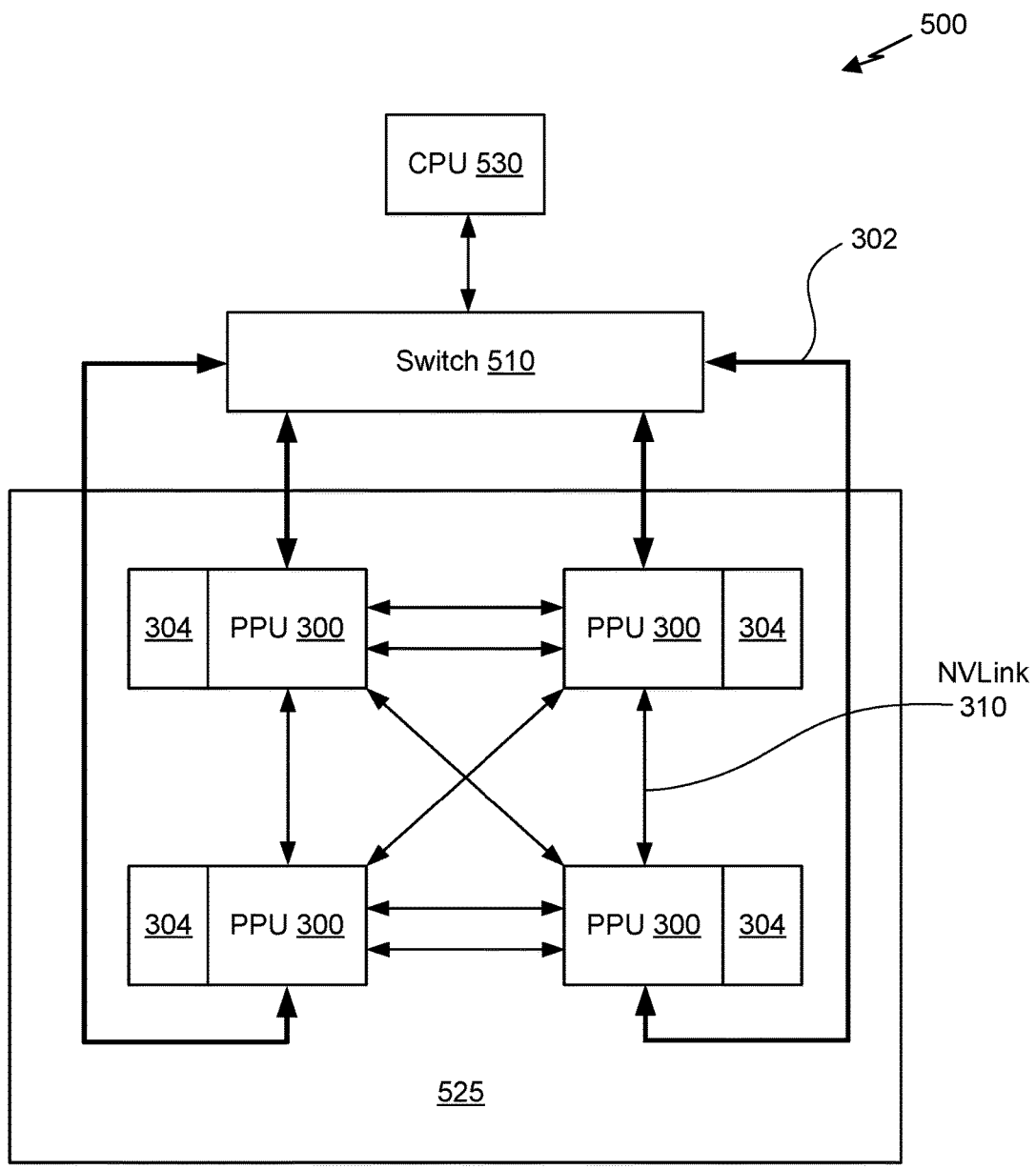
FIG. 5B is a conceptual diagram of a processing system implemented using the PPU of FIG. 3, in accordance with an embodiment.

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased FIG. 5B is a conceptual diagram of a processing system 500 implemented using the PPU 300 of FIG. 3, in accordance with an embodiment. The processing system 500 may be configured to implement the method 110 shown in FIG. 1A. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
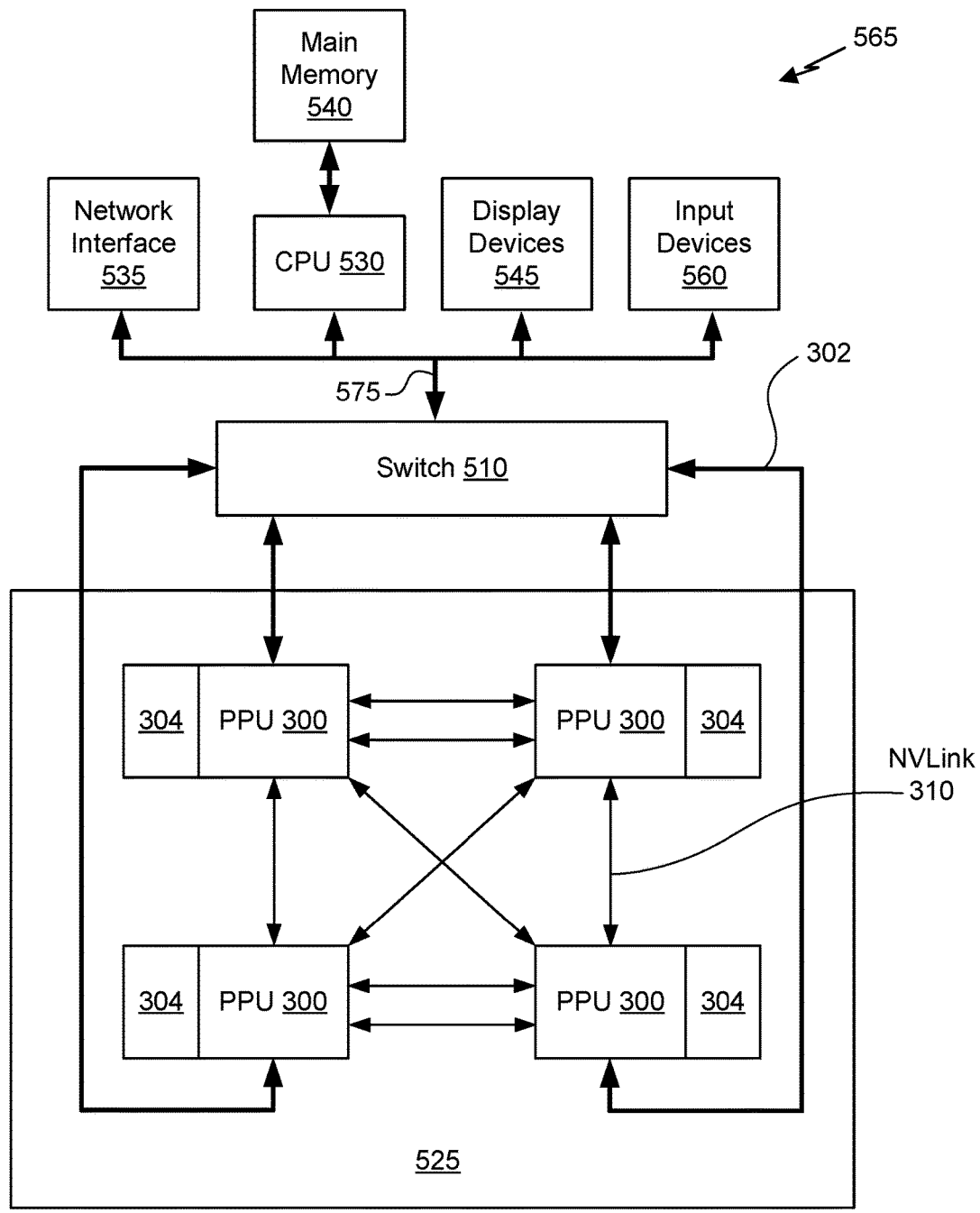
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 110 shown in FIG. 1A.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e.

a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
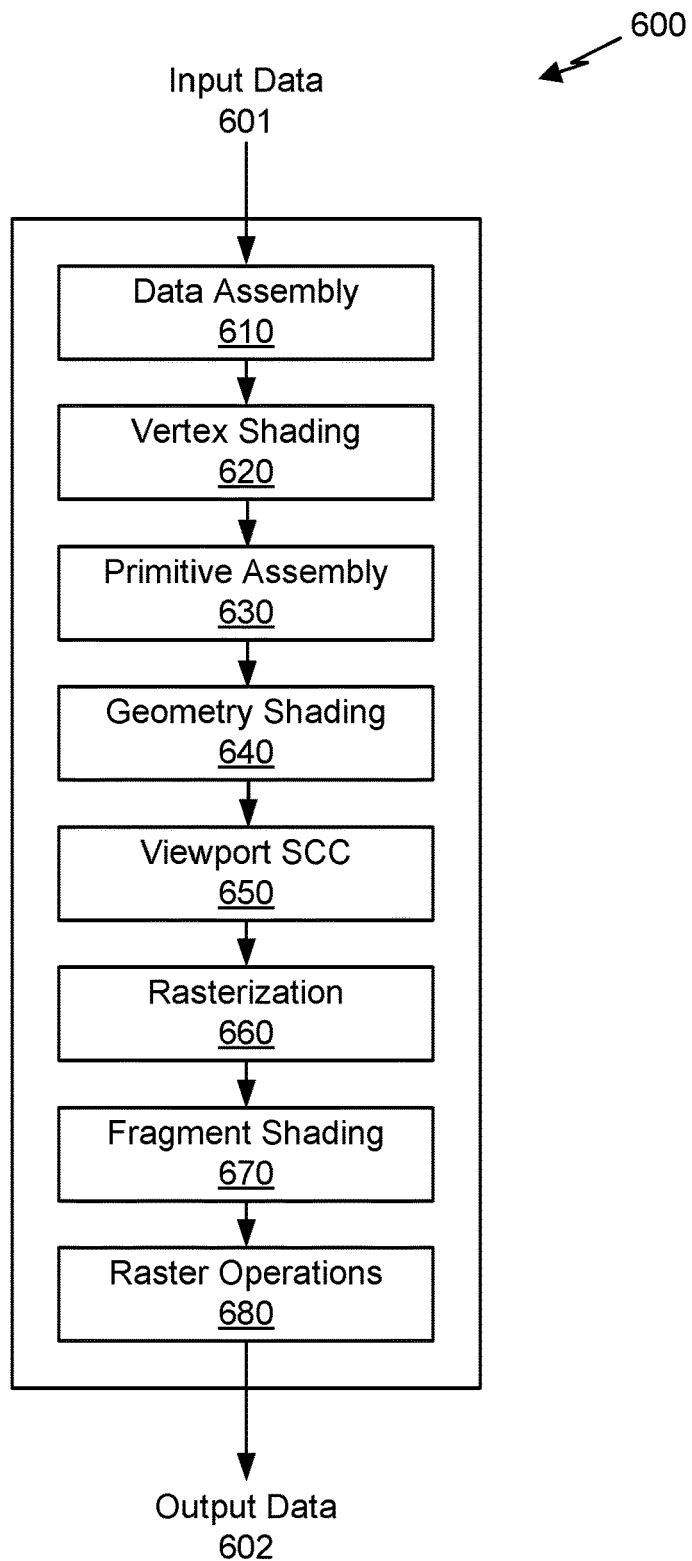
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (SCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

While various embodiments have been described above, it should be understood that they have been presented by way of example only, and not limitation. Thus, the breadth and scope of the present application should not be limited by any of the above-described exemplary embodiments, but should be defined only in accordance with the following and later-submitted claims and their equivalents.

What is claimed is:

1. A method for reporting a texture footprint, comprising:
receiving, from a shader program, a texture footprint query request that includes texture map coordinates, wherein the texture footprint query request is associated with a pixel in screen space covered by rasterized geometry;
identifying texels comprising a texture footprint for a texture map filtering operation that corresponds to the texture footprint query request; and
transmitting, to the shader program, query result information comprising the texture footprint,
wherein transmitting comprises storing the query result information in a memory circuit that is accessible to the shader program.

2. The method of claim 1, wherein the texture map coordinates include two dimensions.

3. The method of claim 1, wherein the texture map coordinates include three dimensions.

4. The method of claim 1, wherein the texture map coordinates are configured to identify a location within a cube-map.

5. The method of claim 1, wherein the texture footprint query request further comprises a gradient at each of the texture map coordinates.

6. The method of claim 1, wherein the texture footprint query request further comprises a texture map level of detail parameter corresponding to the texture footprint.

7. The method of claim 1, wherein the texture footprint query request further comprises a resolution specification for the query result information.

8. The method of claim 7, wherein the query result information comprises a bitmap generated to indicate the texture footprint according to the resolution specification and a coarsening factor generated to indicate a scale having a value of one or more texels per bit of the bitmap in a dimension of the resolution specification.

9. The method of claim 8, wherein the scale is calculated to encompass the texture footprint in the dimension based on the resolution specification.

10. The method of claim 1, wherein the query result information comprises a fixed length bitmap, and each bit of the fixed length bitmap represents a region of one or more texels covered by the texture footprint.

11. The method of claim 10, wherein the fixed length bitmap comprises sixty-four bits.

12. The method of claim 11, wherein the sixty-four bits indicate a set of texels organized as one of 8-by-8 texels, 16-by-4 texels, 32-by-2 texels, or 4-by-4-by-4 texels.

13. The method of claim 1, wherein the query result information comprises an anchor point calculated to indicate a location for the texture footprint within a texture map coordinate space.

14. The method of claim 1, wherein identifying comprises projecting a texture sampling region into texel space at the texture map coordinates, and marking each texel covered by the projected texture sampling region.

15. A processing unit, configured to:
receive, from a shader program, a texture footprint query request that includes texture map coordinates, wherein the texture footprint query request is associated with a pixel in screen space covered by rasterized geometry;
identify texels comprising a texture footprint for a texture map filtering operation that corresponds to the texture footprint query request; and
transmit, to the shader program, query result information comprising the texture footprint,
wherein to transmit, the processing unit stores the query result information in a memory circuit that is accessible to the shader program.

16. The processing unit of claim 15, wherein the texture map coordinates include one of: two dimensions, three dimensions, a location within a cube-map.

17. The processing unit of claim 15, wherein the texture footprint query request further comprises at least one of: a gradient at each of the texture map coordinates; a texture map level of detail parameter corresponding to the texture footprint; or a resolution specification for the query result information.

18. The processing unit of claim 15, wherein the query result information comprises at least one of: a fixed length bitmap with each bit of the fixed length bitmap configured to represent a region of one or more texels covered by the texture footprint; or an anchor point calculated to indicate a location for the texture footprint within a texture map coordinate space.

19. The processing unit of claim 15, wherein identifying comprises projecting a texture sampling region into texel space at the texture map coordinates, and marking each texel covered by the projected texture sampling region.

20. A non-transitory, computer-readable storage medium storing instructions that, when executed by a processor, cause the processor to:
receive, from a shader program, a texture footprint query request that includes texture map coordinates, wherein the texture footprint query request is associated with a pixel in screen space covered by rasterized geometry;

identify texels comprising a texture footprint for a texture map filtering operation that corresponds to the texture footprint query request; and transmit, to the shader program, query result information comprising the texture footprint, wherein to transmit, the GPU stores the query result information in a memory circuit that is accessible to the shader program.

\* \* \* \* \*